United States Patent
Yarygin et al.

(10) Patent No.: US 9,886,980 B2
(45) Date of Patent: Feb. 6, 2018

(54) METHOD FOR SYNCHRONIZING A/V STREAMS

(71) Applicant: Silicon Image, Inc., Sunnyvale, CA (US)

(72) Inventors: Sergey Yarygin, San Jose, CA (US); Taliaferro Smith, San Jose, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 196 days.

(21) Appl. No.: 14/703,802

(22) Filed: May 4, 2015

(65) Prior Publication Data

US 2015/0319405 A1 Nov. 5, 2015

Related U.S. Application Data

(60) Provisional application No. 61/988,812, filed on May 5, 2014.

(51) Int. Cl.
| | |
|---|---|
| *H04N 5/932* | (2006.01) |
| *H04N 5/935* | (2006.01) |
| *G11B 27/00* | (2006.01) |
| *H04N 5/775* | (2006.01) |
| *G06F 3/16* | (2006.01) |
| *H04N 21/40* | (2011.01) |
| *H04N 21/43* | (2011.01) |
| *G11B 27/10* | (2006.01) |
| *H04N 5/60* | (2006.01) |

(52) U.S. Cl.
CPC ............ *G11B 27/00* (2013.01); *G06F 3/16* (2013.01); *G11B 27/10* (2013.01); *H04N 5/775* (2013.01); *H04N 5/935* (2013.01); *H04N 21/40* (2013.01); *H04N 21/4302* (2013.01); *H04N 5/60* (2013.01)

(58) Field of Classification Search
None
See application file for complete search history.

(56) References Cited

U.S. PATENT DOCUMENTS

2009/0073316 A1* 3/2009 Ejima .................. H04N 5/04
348/515
2012/0124606 A1* 5/2012 Tidwell ............ H04N 21/25833
725/17

OTHER PUBLICATIONS

"Understanding EDID—Extended Display Identification Data," Extron®, Revision 1.0, Jun. 11, 2009, pp. 1-7.
"VESA Enhanced Extended Display Identification Data Standard," Release A, Revision 1, VESA—Video Electronics Standards Association, Feb. 9, 2000, 32 pages.
"Extended Display Identification (EDID) A Primer," Quantum Data, Inc., undated, 8 pages.

* cited by examiner

*Primary Examiner* — Heather Jones
(74) *Attorney, Agent, or Firm* — Fenwick & West LLP

(57) ABSTRACT

A device may communicate a delay request value to downstream devices in order to synchronize A/V streams. For example, rather than adding the delay required to synchronize audio and video streams, an A/V splitter may instead communicate to downstream devices, asking them to add the amount of delay desired.

21 Claims, 11 Drawing Sheets

| Byte # | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1 | 24-bit IEEE Registration Identifier (0x000C03) (least significant byte first) | | | | | | | |
| 2 | | | | | | | | |
| 3 | | | | | | | | |
| 4 | A | | | | B | | | |
| 5 | C | | | | D | | | |
| 6 | Supports_AI | DC_48bit | DC_36bit | DC_30bit | DC_Y444 | Rsvd (0) | Rsvd (0) | DVI_Dual |
| 7 | Max_TMDS_Clock | | | | | | | |
| 8 | Latency_Fields_Present | I_Latency_Fields_Present | HDMI_Video_present | Rsvd (0) | CNC3 | CNC2 | CNC1 | CNC0 |
| (9) | Video_Latency | | | | | | | |
| (10) | Audio_Latency | | | | | | | |
| (11) | Interlaced_Video_Latency | | | | | | | |
| (12) | Interlaced_Audio_Latency | | | | | | | |
| (13) | 3D_present | 3D_Multi_present | | Image_Size | | Rsvd (0) | Rsvd (0) | Rsvd (0) |
| (14) | HDMI_VIC_LEN | | | | HDMI_3D_LEN | | | |
| (15) | (if HDMI_VIC_LEN > 0) HDMI_VIC_1 | | | | | | | |
| ... | ... | | | | | | | |
| | HDMI_VIC_M | | | | | | | |
| | (if 3D_Multi_present = 01 or 10) 3D_Structure_ALL_15...8 | | | | | | | |
| | 3D_Structure_ALL_7...0 | | | | | | | |
| | (if 3D_Multi_present = 10) 3D_MASK_15...8 | | | | | | | |
| | 3D_MASK_7...0 | | | | | | | |
| | 2D_VIC_order_1 | | | | 3D_Structure_1 | | | |

→ extension fields ↓

FIG. 1B

METHOD FOR SYNCHRONIZING A/V STREAMS

CROSS-REFERENCE TO RELATED APPLICATION(S)

This application claims priority under 35 U.S.C. § 119(e) to U.S. Provisional Patent Application Ser. No. 61/988,812, "Lip Sync Delay Compensation," filed May 5, 2014. The subject matter of all of the foregoing is incorporated herein by reference in their entirety.

BACKGROUND OF THE INVENTION

1. Field of the Invention

This invention relates generally to processing A/V streams and, more particularly, to synchronizing A/V streams, for example high definition A/V streams.

2. Description of the Related Art

Audio and video streams that are related to each other can be transmitted together, for example, by using a single HDMI or MHL cable. When the audio and video streams are to be rendered on separate devices, they may need to be synchronized. For example, a movie program with both audio and video streams can be transmitted from a single playback device, e.g., a Blu-ray player to an A/V splitter. The A/V splitter transmits the video stream to an HDTV display and separately transmits the audio stream to a receiver/speakers. An HDTV display will usually require a longer processing time to display the video stream than the receiver/speakers to amplify and produce audio. As a result, the audio and video playback may not be synchronized.

To address this problem, one solution is for the A/V splitter to add delay to the audio stream in order to compensate for the longer processing time required for the video stream. However, this solution requires that the A/V splitter have the capability to both calculate the required delay and add the delay to the A/V stream. The A/V splitter does not always have this capability.

Thus, there is a need for better approaches to synchronize A/V streams.

SUMMARY

The present invention overcomes the limitations of the prior art by enabling a device to communicate a delay request value to downstream devices. For example, rather than adding the delay required to synchronize audio and video streams, the A/V splitter may instead communicate to the receiver/speakers the amount of delay desired. The receiver/speakers may then add the delay.

In one embodiment, a device receives at least two latency delay values from at least two downstream devices. The latency values represent downstream latency experienced by A/V streams transmitted to the downstream devices. A delay request value is calculated, which represents additional delay to be added by one of the downstream devices to the A/V stream received by that downstream device. The delay request value is transmitted to the downstream device, which preferably then implements the requested delay.

Other aspects include components, devices, systems, improvements, methods, processes, applications and other technologies related to the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 1B (prior art) is a diagram of an EDID data structure containing audio and video latency values.

FIGS. 2A, 2B and 2D are block diagrams that illustrate another approach to synchronizing A/V streams according to an embodiment.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1A:
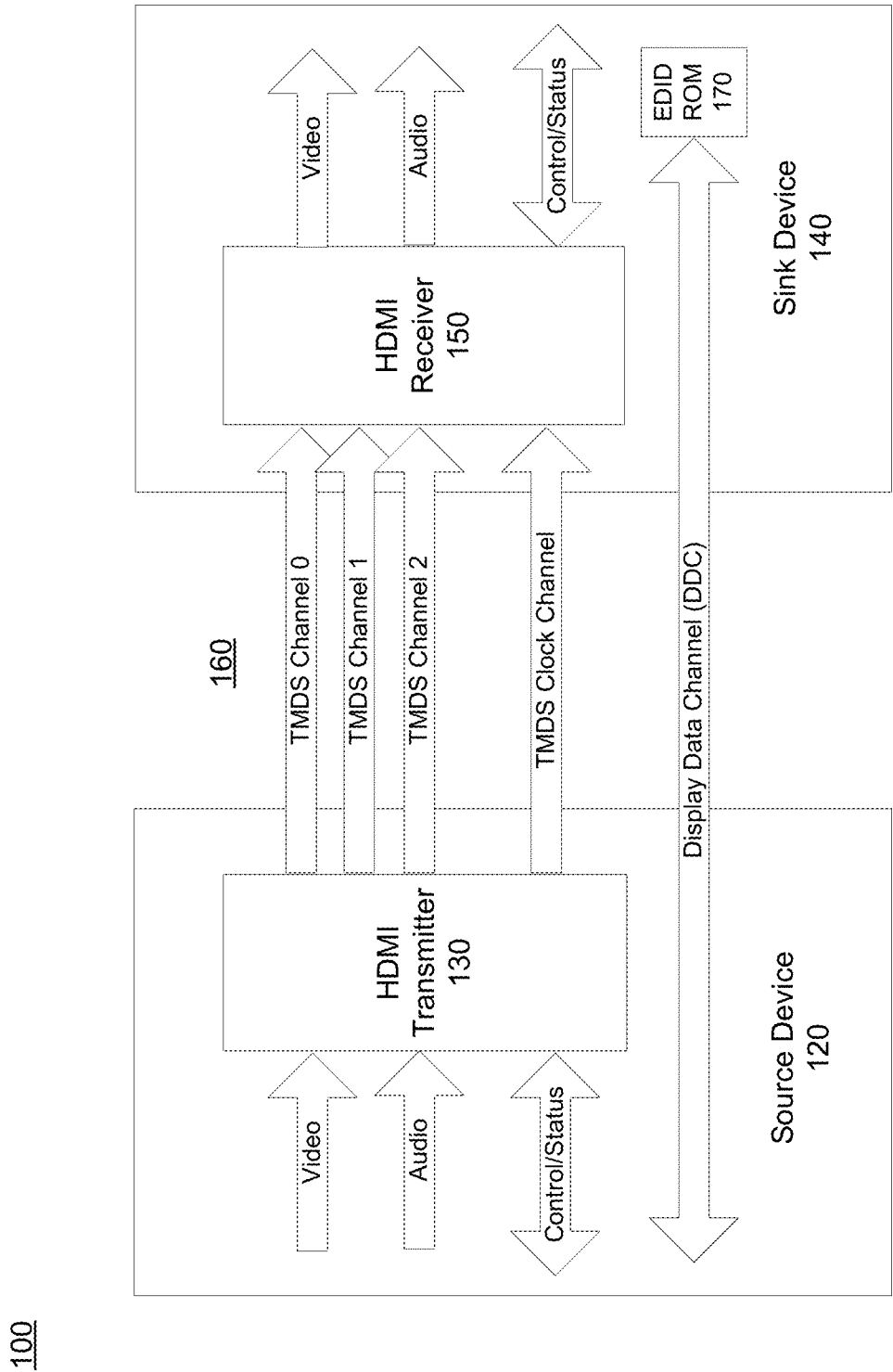
FIG. 1A (prior art) is a block diagram of a system including an HDMI link.

FIG. 1A (prior art) is a block diagram of a system including an HDMI link. The system 100 includes a source device 120, a sink device 140, and the HDMI link 160. The source device includes an HDMI transmitter 130 that processes audio, video, and other control/status signals for transmission via the HDMI link 160. The sink device 140 includes an HDMI receiver 150 that receives the audio, video, and other control/status signals from the HDMI link 160 and processes those signals for retransmission or display. The HDMI link 160 includes four TMDS (transition-minimized differential signaling) channels: TMDS data channel 0, TMDS data channel 1, TMDS data channel 2, and a TMDS clock channel.

Each of the four channels includes three conductors: a differential pair and a dedicated ground. The TMDS data channel 0 includes the differential pair D0+ and D0− and the dedicated ground D0_G. The TMDS data channel 1 includes the differential pair D1+ and D1− and the dedicated ground D1_G. The TMDS data channel 2 includes the differential pair D2+ and D2− and the dedicated ground D2_G. The TMDS clock channel includes the differential pair CK+ and CK− and the dedicated ground CK_G. Audio, video and auxiliary control/status data is transmitted over the three TMDS data channels. Each differential pair of the TMDS data channels forms a logical communication channel that carry multimedia data streams. A clock signal is transmitted on the TMDS clock channel and is used by the HDMI receiver 150 as a frequency reference for data recovery on the three TMDS data channels.

TMDS (transition-minimized differential signaling) is a differential signaling technology designed to transmit high-speed serial data that meets the requirements of current HDMI and earlier DVI specifications. The use of differential signaling is helpful to reduce the crosstalk between different channels.

An HDMI link also includes a display data channel (DDC). The DDC is a channel for configuration and status exchange between the source device and sink device. The source device uses the DDC to read and discover the sink device's configuration and/or capabilities from the sink device's Extended Display Identification Data (EDID) data structure. The EDID data structure is stored in the EDID ROM 170 of the sink device.

A sink device may declare audio and/or video latency values in the EDID data structure. Latency values indicate the amount of delay between the A/V stream entering the HDMI input to the actual presentation to the user (on a display or speakers), whether that presentation is performed by the device itself or by another device downstream. More particularly, if the presentation is performed by the device itself, the latency values typically are a result of the processing time required by the device. If the presentation is performed by a device that is further downstream, the latency values typically would also include delays incurred at the additional downstream devices. With access to latency information, a source device may determine how to maintain synchronization of A/V streams.

FIG. 1B (prior art) is a diagram of an EDID data structure containing audio and video latency values. The data structure is an HDMI Vendor-Specific Data Block, which enables a source device to determine the type of the sink device and its configuration and status. The example shown in FIG. 1B is part of the HDMI standard, and is also in compliance with the CEA-861-D standard. In FIG. 1B, the audio and video latency values are potentially stored in Bytes 8-12. In Byte 8, the bit Latency_Fields_Present indicate whether latency values are provided in this data structure. In Byte 8, the bit I_Latency_Fields_Present indicate whether latency values for interlaced display are provided in this data structure. Bytes 9 and 10 are used for storing the video and audio latency values when transmitting a progressive video format, whereas Bytes 11 and 12 are used for storing the video and audio latency values when transmitting an interlaced video format.

A conventional HDMI link, as described above in FIG. 1, may be modified as described below to allow an upstream device to communicate requested delays to downstream devices. HDMI is just one example of a standard for the communication of A/V streams, and the techniques described herein can also be applied to other standards and specifications, including MHL, SuperMHL and DisplayPort for example.

FIGS. 2A-2D are block diagrams that illustrate various approaches to synchronizing A/V streams. The term A/V streams is meant to include audio streams without video, video streams without audio, and mixed audio and video streams. The system shown in FIG. 2A includes an upstream device 202, a stream duplicator 204, and two downstream devices 206 and 208. The upstream device is a Blu-ray player 202. The two downstream devices are a TV 206 and an AV receiver 208. The A/V streams from the Blu-ray player 202 are transmitted via a cable (not shown) to the stream duplicator 204 and include both an audio stream represented by a dashed line and a video stream represented by a solid line. The stream duplicator 204 duplicates the received A/V streams and transmits the two duplicated A/V streams to each of the TV 206 and the AV receiver 208, respectively, also using cables. The TV 206 discards the audio stream, as indicated by the circle end, and renders the video stream on its screen. Likewise, the AV receiver 208 discards the video stream and renders the audio stream to be produced by the speakers.

Figure 2A:
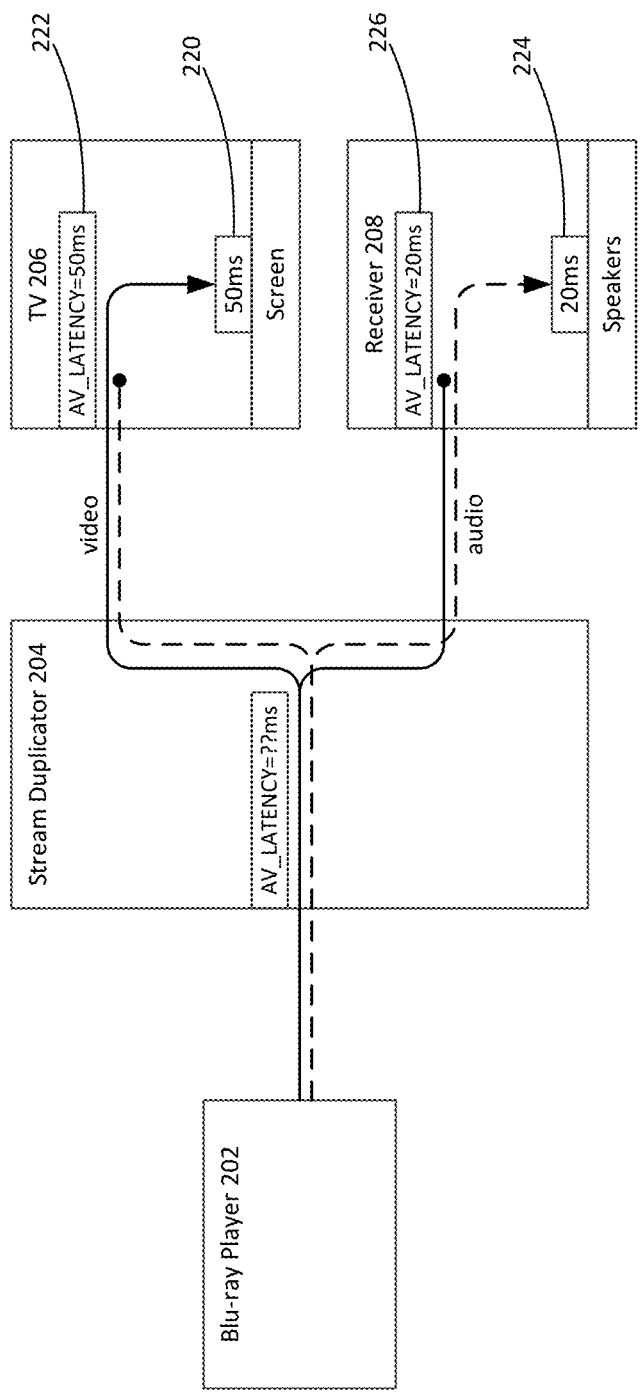
FIGS. 2A, 2B and 2C are block diagrams that illustrate one approach to synchronizing A/V streams according to an embodiment.

Each of the downstream devices, the TV 206 and the AV receiver 208, adds some delay, for example in order to process the audio and/or video stream for rendering. In FIG. 2A, the TV 206 adds a 50 ms delay in order to process the video stream, as indicated by block 220. The AV receiver 208 adds a 20 ms delay to the audio stream, as indicated by block 224. If the audio and video streams were rendered using these delays, the audio stream would be 30 ms ahead of the video stream, which is unacceptable to users.

Each of the TV 206 and the AV receiver 208 may declare its audio and/or video latency information, for example using EDID for HDMI or using DCDB in SuperMHL. The latency information for the TV 206 is indicated by block 222. The latency information for the AV receiver 208 is indicated by block 226. The stream duplicator 204 reads these latency values and determines that the two A/V streams are not synchronized. If it had the capability, the stream duplicator 204 could synchronize the two A/V streams by adding 30 ms delay to the A/V stream transmitted to AV receiver 208. However, the stream duplicator 204 may not have this capability.

Figure 2B:
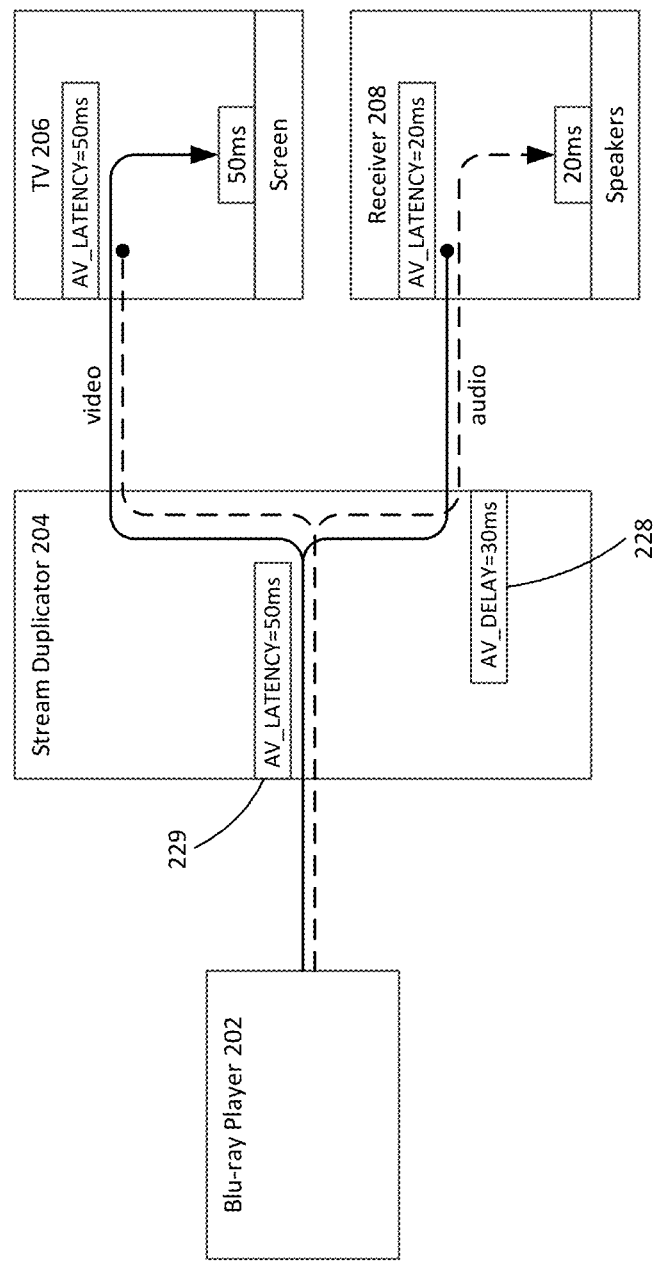

Instead, in FIG. 2B, based on the TV 206's latency value of 50 ms and the AV receiver 208's latency value of 20 ms, the stream duplicator 204 determines that a 30 ms delay should be added to the A/V stream transmitted to the AV receiver 208 to ensure synchronization among all A/V streams. Instead of adding this delay (e.g., if it does not have the capability to do so), the stream duplicator 204 transmits to the AV receiver 208 a delay request value of 30 ms, as indicated by block 228. The stream duplicator 204 may also update its latency value to be 50 ms (block 229), since this would be the latency for both A/V streams if the AV receiver 208 implements the requested delay.

Figure 2C:
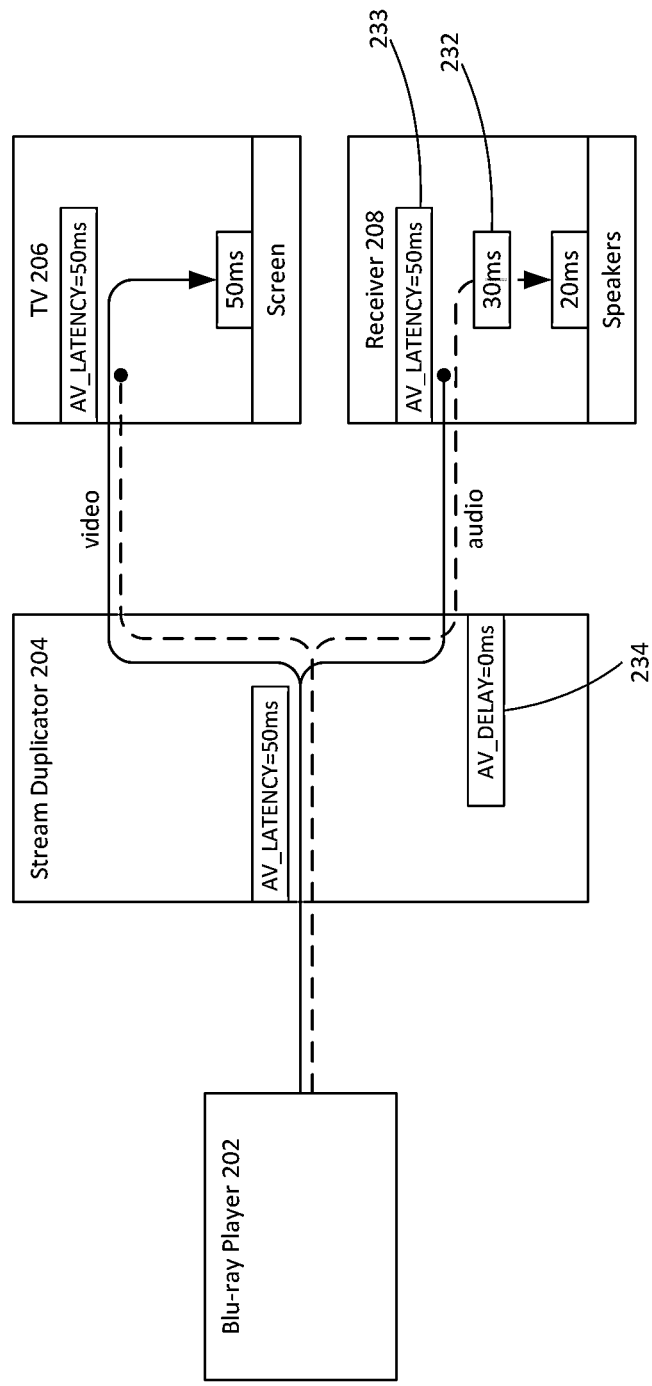

FIG. 2C illustrates one possible response by the AV receiver 208. In this example, the AV receiver 208 adds the additional downstream delay of 30 ms to the A/V stream received from the stream duplicator 204 (indicated by block 232). It them updates its own latency value 233 to 50 ms to reflect the additional added delay. When the stream duplicator 204 receives the updated latency value of 50 ms, it realizes that the TV 206 and receiver 208 have been synchronized and no additional delay is required. Thus, the stream duplicator 204 updates its delay request value 234 to 0.

Figure 2D:
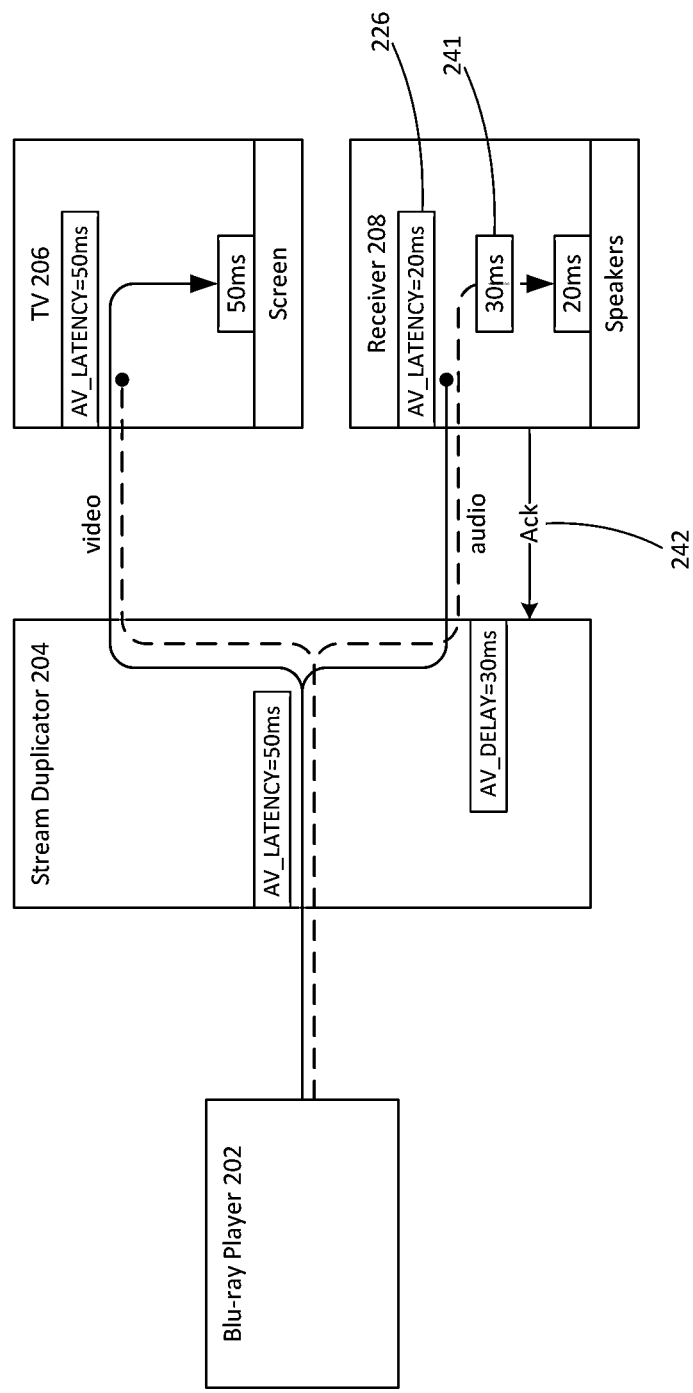

FIG. 2D illustrates another approach. In FIG. 2D, after the AV receiver 208 receives a delay request value of 30 ms from the stream duplicator 204 and adds the additional downstream delay 241 of 30 ms to the audio stream. The AV receiver 208 does not update its latency value 226. Instead, the AV receiver 208 sends an acknowledgement 242 to the stream duplicator 204, to confirm that the additional downstream delay of 30 ms has been added to the audio stream. The acknowledgement 242 could be communicated via various channels.

Figure 3:
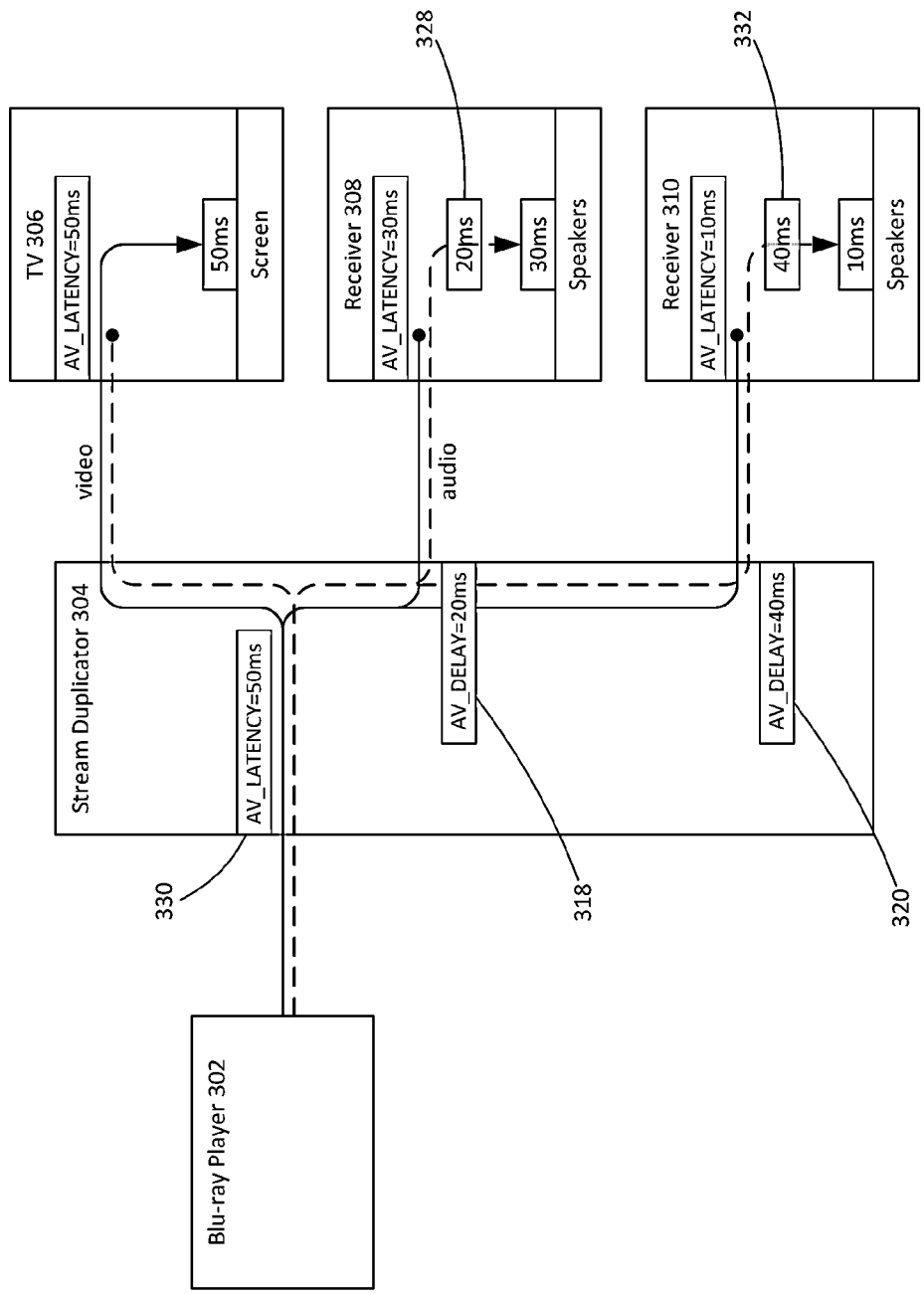
FIG. 3 is a block diagram illustrating synchronization of audio streams.

FIG. 3 is a block diagram illustrating another example of synchronization of A/V streams. In FIG. 3, in addition to the Blu-ray player 302 and the stream duplicator 304, there are three playback devices: the TV 306, and two AV receivers 308 and 310. To determine the delay request values for this scenario, the stream duplicator 304 receives the latency values for all three downstream devices: 50 ms for the TV 306, 30 ms for the AV receiver 308, and 10 ms for the AV receiver 310. The stream duplicator 304 determines that the maximum value of all the latency values is 50 ms from the TV 306 and sets this value as its latency value 330. The stream duplicator 304 then determines a delay request value for each of the other two downstream devices. For the AV receiver 308, the delay request value 318 is 50 ms–30 ms=20 ms. For the AV receiver 310, the delay request value 320 is 50 ms–10 ms=40 ms. The stream duplicator 304 transmits the delay request values 318, 320 to the AV receiver 308 and the AV receiver 310, respectively. The AV receiver 308 adds the 20 ms delay (block 328) to its audio stream, and the AV receiver 310 adds the 40 ms delay (block 332) to its audio stream. The three A/V streams are then synchronized on playback.

FIGS. 4A-4D are block diagrams illustrating the use of delay request values in a tiered architecture. Unused A/V streams are omitted for clarity. In this example, there are two stream duplicators 404 and 414, where the duplicator 414 is a downstream device of the stream duplicator 404. The stream duplicator 404 supplies another two direct downstream devices, the TV 406 and the AV receiver 408. The stream duplicator 414 also has two downstream devices, the TV 416 and the AV receiver 418. The TV 406 has a latency value of 50 ms, the AV receiver 408 has 40 ms, the TV 416 has 40 ms and the AV receiver 418 has 30 ms.

Figure 4A:
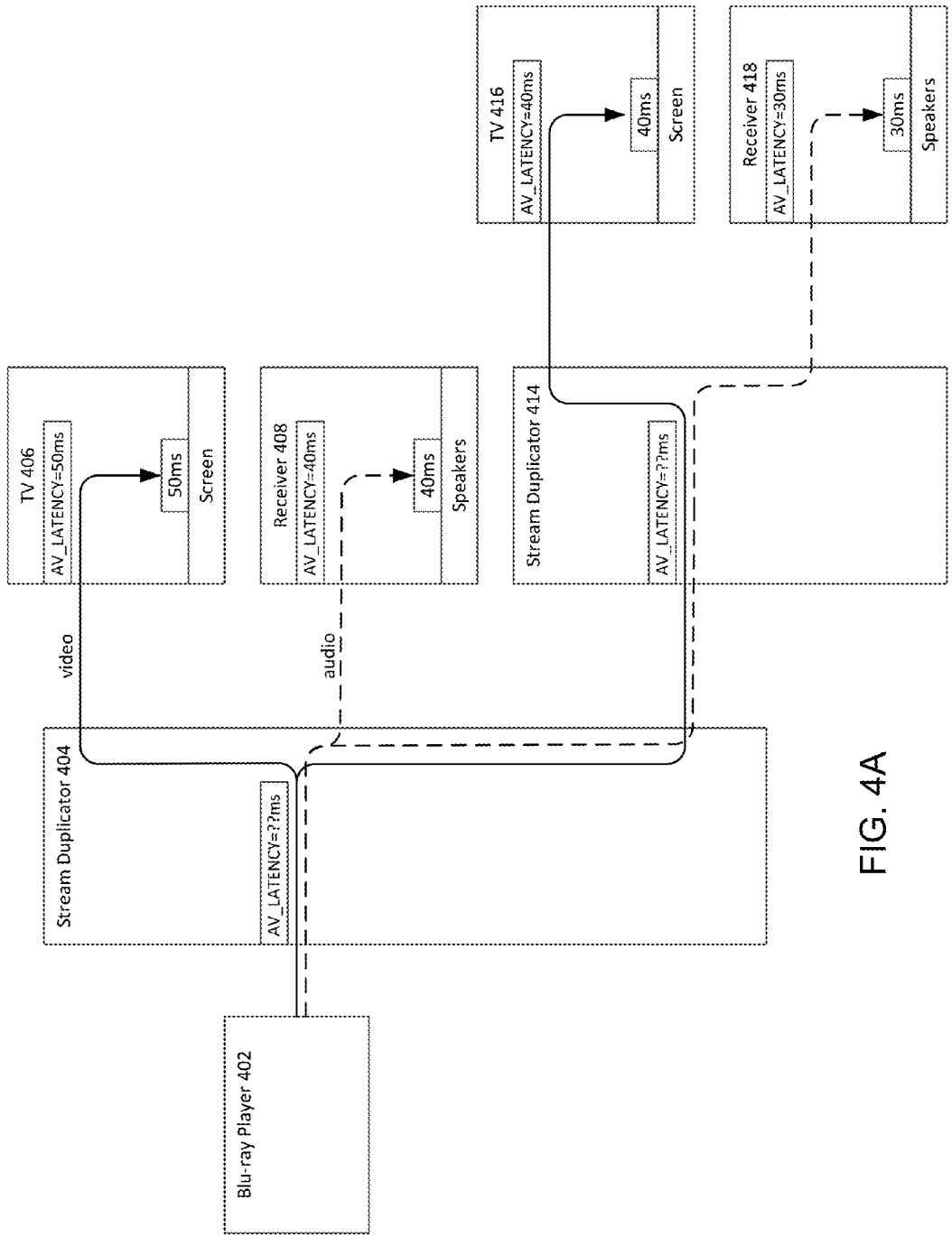
FIGS. 4A-4D are block diagrams illustrating the use of delay request values in a tiered architecture.
Figure 4B:
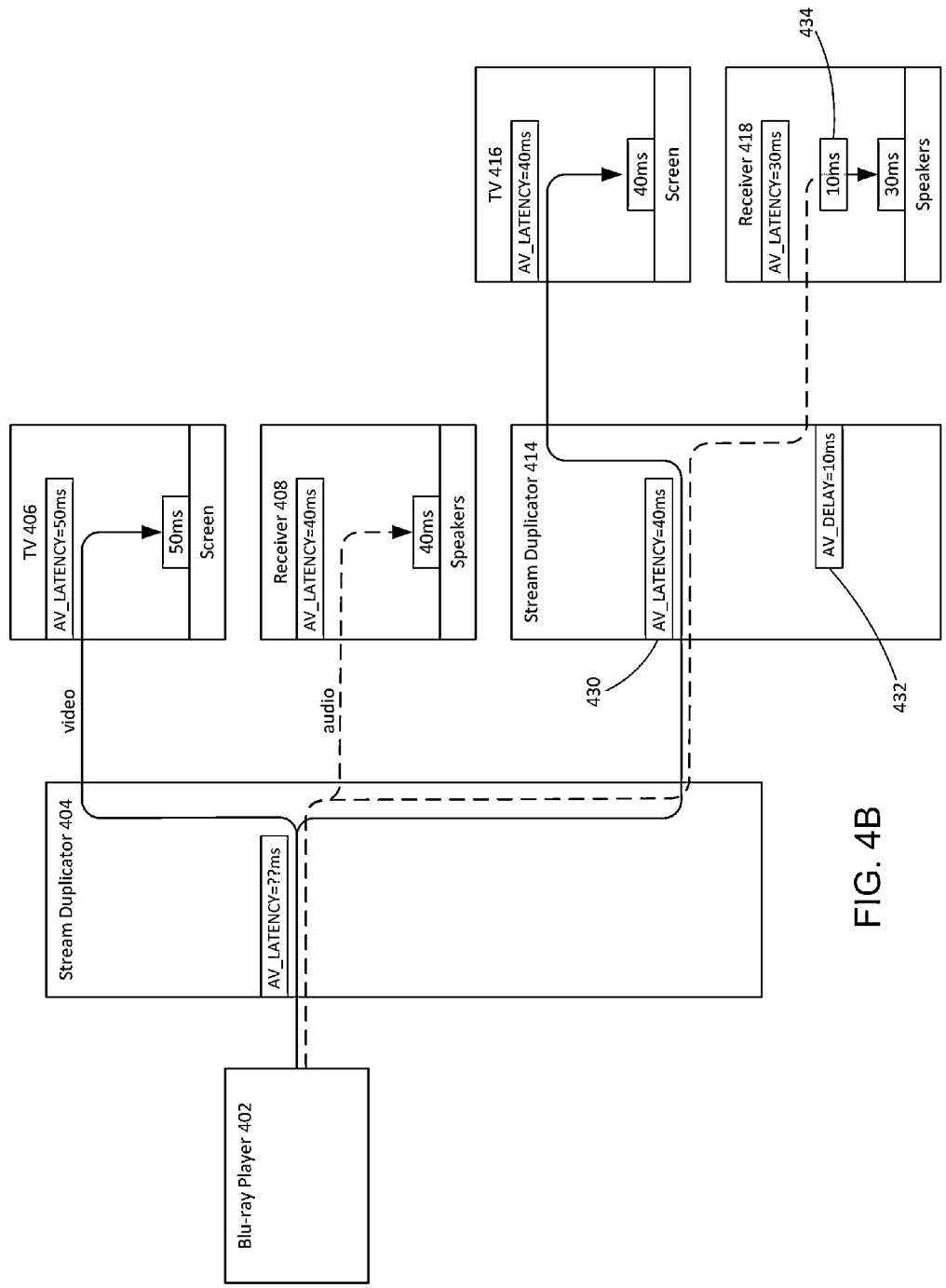

In FIG. 4B, the stream duplicator 414 obtains the latency values of the TV 416 and the AV receiver 418. The stream duplicator 414 determines that the maximum latency value among its downstream devices is 40 ms. It sets its own latency value 430 as 40 ms, and transmits a delay request value 432 of 10 ms to AV receiver 418. No additional delay is needed for TV 416. The AV receiver 418 adds an additional delay 434 of 10 ms.

Figure 4C:
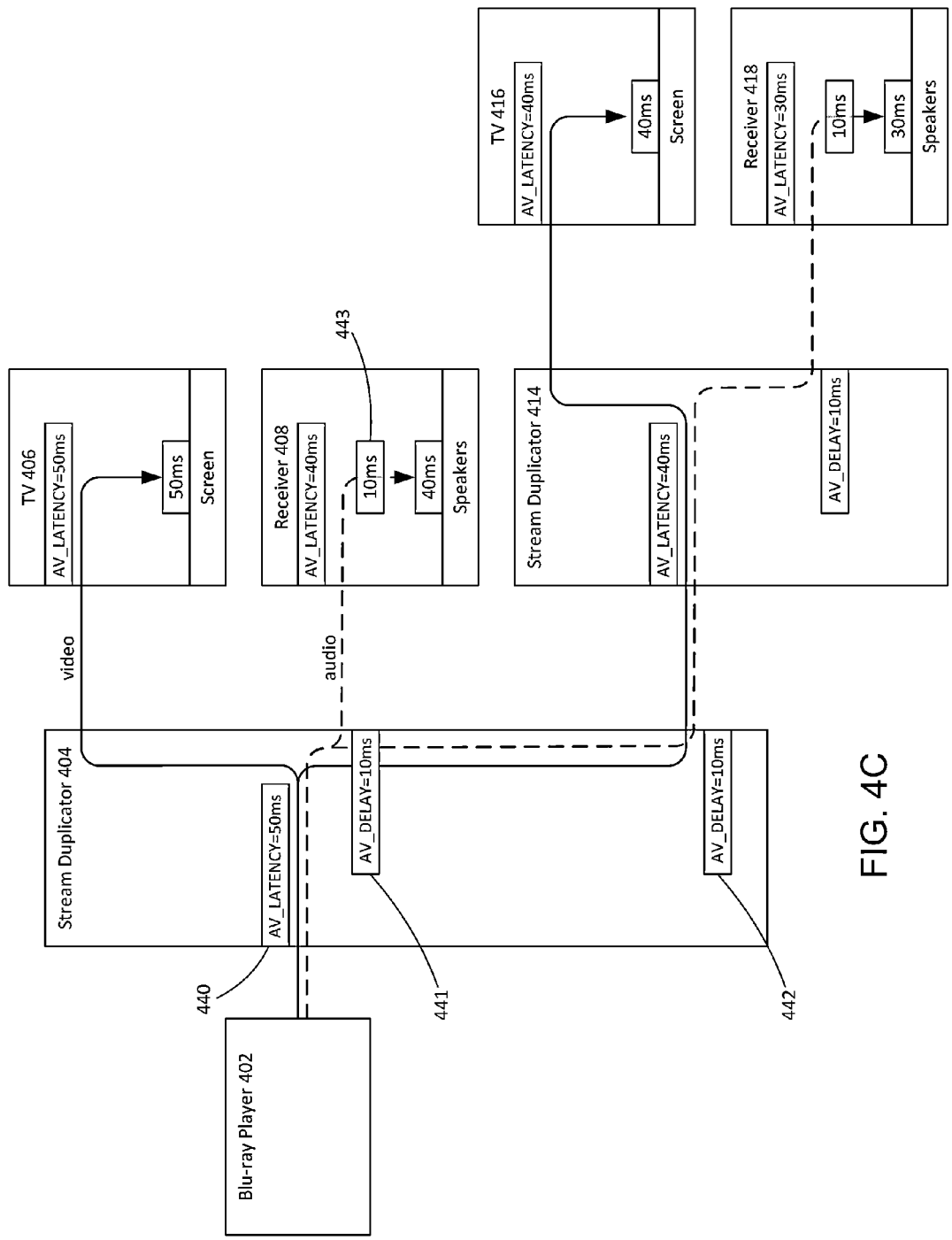

In FIG. 4C, the stream duplicator 404 obtains the latency values of the TV 406, AV receiver 408, and stream duplicator 414. The stream duplicator 404 determines that the maximum latency value among its downstream devices is 50 ms. It sets its own latency value 440 as 50 ms, and transmits a delay request value 441 of 10 ms to AV receiver 408 and also transmits a delay request value 442 of 10 ms to stream duplicator 414. The AV receiver 408 adds an additional delay 443 of 10 ms, thus synchronizing the A/V streams for TV 406 and receiver 408. If the stream duplicator 414 ignores the delay request from the stream duplicator 404, then the A/V streams for TV 416 and AV receiver 418 will be synchronized to each other but not to the A/V streams for TV 406 and AV receiver 408.

Figure 4D:
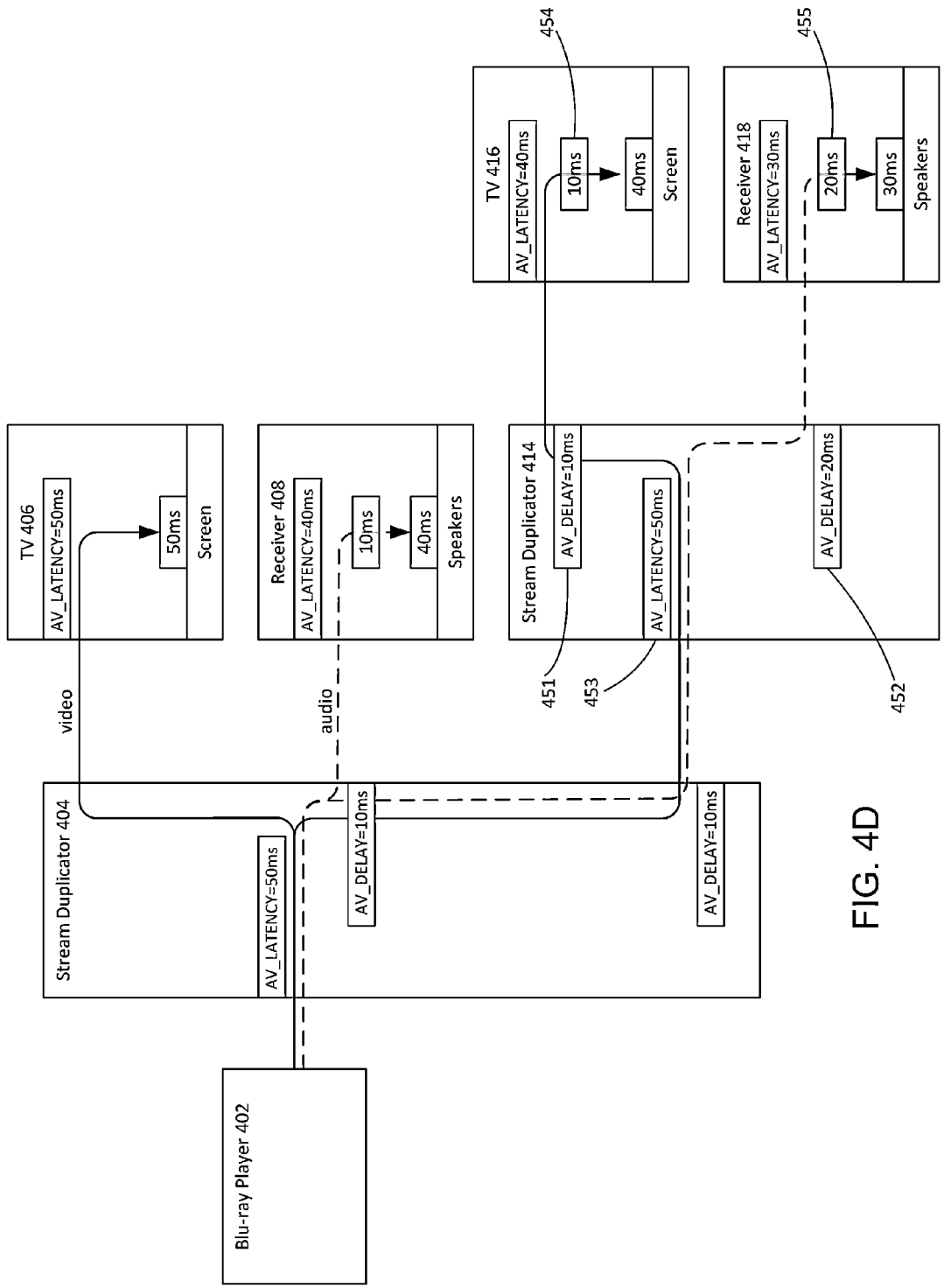

In the example of FIG. 4D, the stream duplicator 414 passes the additional 10 ms delay request to the TV 416 and the AV receiver 418. So the delay request value 451 for TV 416 is 10 ms and the delay request value 452 for AV receiver 418 is increased to 20 ms. The stream duplicator 414 also increases its own latency value 453 to 50 ms. The TV 416 adds the 10 ms requested delay 454 to the video stream before processing. The AV receiver 418 adds the 20 ms requested delay 455 to the audio stream. Accordingly, not only are the A/V streams for the TV 416 and the AV receiver 418 synchronized, but they will also be synchronized with the A/V streams for the TV 406 and the AV receiver 408.

Although the detailed description contains many specifics, these should not be construed as limiting the scope of the invention but merely as illustrating different examples and aspects of the invention. It should be appreciated that the scope of the invention includes other embodiments not discussed in detail above. For example, the A/V streams to be synchronized typically are a video stream and the corresponding audio stream. However, they could be other groups of A/V streams. Audio may be recorded in multiple channels and it may be desirable to synchronize all of the audio streams for different channels even though they are played back through multiple different devices. Alternately, there may be multiple coordinated video streams, such as different simultaneous views of an event or multiple views that are stitched together to make a larger view or panorama.

As another example, other functions can be used to calculate a delay request value, other than using the maximum value among downstream devices. If 20 ms additional delay is desired, a device might add 10 ms and then transmit a delay request value of 10 ms to the downstream devices. In addition, the examples above usually yield full synchronization among the A/V streams. However, other embodiments may result in partial synchronization, where the time delay between different A/V streams is reduced but not necessarily to zero. Alternately, in some applications, "synchronization" may be defined as including a desired amount of delay between channels.

In another aspect, the latency value and the delay request value may be received and transmitted via the same channel, and also via the same channel on which the A/V stream is transmitted. However, that is not required. They may also be transmitted on separate channels, for example.

The delay request value is preferably calculated and transmitted to a downstream device before transmitting the A/V streams. The delay request value may be static or fixed, or be dynamic in that the value can be changed as needed while the A/V streams are being transmitted. The delay request value may be selected from a predefined set of values. In the above examples, a stream duplicator may indicate its latency value using EDID or DCDB. However, the latency value may also be reported to an upstream device (e.g., a Blu-ray player) by the stream duplicator. Also, devices other than stream duplicators may also take full advantage of these techniques.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A method for synchronizing A/V streams, the method comprising:
    receiving at least two latency values from at least two separate downstream devices to receive the A/V streams, each latency value representing downstream delay experienced by a corresponding A/V stream transmitted to a corresponding downstream device;
    calculating a delay request value based on the received latency values, the delay request value representing additional downstream delay to be added to a first of the A/V streams in order to better synchronize the A/V streams;
    transmitting the delay request value to a first of the downstream devices, the first downstream device to receive the first A/V stream; and
    transmitting the A/V streams to the downstream devices.

2. The method of claim 1, wherein the A/V streams include a video stream and an audio stream for the video stream, and the delay request value represents additional downstream delay to be added to either the audio stream or the video stream in order to better synchronize the audio stream and video stream.

3. The method of claim 1, wherein the A/V streams include at least two identical A/V streams created by duplicating an original A/V stream, and the delay request value represents additional downstream delay to be added to one of the identical A/V streams in order to better synchronize the at least two identical A/V streams.

4. The method of claim 1, wherein the method is performed by a device that has no capability to add delay to any of the A/V streams.

5. The method of claim 1, wherein the delay request value is a function of all received latency values.

6. The method of claim 5, wherein the delay request value represents additional downstream delay to be added to the first A/V stream in order to synchronize all of the A/V streams.

7. The method of claim 5, wherein the A/V streams include a plurality of audio streams, and the delay request value represents additional downstream delay to be added to the first A/V stream in order to synchronize all of the audio streams.

8. The method of claim 5, wherein the A/V streams include at least two A/V streams created by duplicating an original A/V stream, and the delay request value represents additional downstream delay to be added to the first A/V stream in order to synchronize all of the duplicate A/V streams.

9. The method of claim 5, wherein the delay request value represents additional downstream delay to be added to the first A/V stream so that a total downstream latency experienced by the first A/V stream equals a maximum of the received latency values.

10. The method of claim 1, further comprising:
adding delay to the first A/V stream, wherein the delay request value is less than it would have been had the delay not been added to the first A/V stream.

11. The method of claim 1, wherein one of the latency values is received from the first downstream device via a first channel, and the delay request value is transmitted to the first downstream device via the first channel.

12. The method of claim 1, wherein the first A/V stream is transmitted to the first downstream device via a first channel, and the delay request value is transmitted to the first downstream device via the first channel.

13. The method of claim 1, wherein the delay request value is transmitted to the first downstream device before the first A/V stream is transmitted to the first downstream device.

14. The method of claim 1, wherein the latency values and the delay request value are static.

15. The method of claim 1, wherein the latency values and the delay request value are dynamic.

16. The method of claim 1, further comprising:
transmitting a latency value to an upstream device, wherein the latency value is in accordance with the delay request value.

17. The method of claim 1, wherein the latency values include not more than one audio latency value and one video latency value from each downstream device.

18. The method of claim 1, further comprising:
receiving from the first downstream device an acknowledgement that the additional downstream delay has been added to the first A/V stream.

19. The method of claim 1, wherein at least some of the A/V streams are transmitted in accordance with an HDMI, MHL, SuperMHL or DisplayPort specification.

20. The method of claim 1, wherein each A/V stream includes at least one of a video stream and an audio stream for the video stream.

21. An A/V repeater device comprising a transmitter section and a processor; the A/V repeater device configured to receive at least two latency values from at least two separate downstream devices to receive the A/V streams, each latency value representing downstream delay experienced by a corresponding A/V stream transmitted to a corresponding downstream device; the processor configured to calculate a delay request value based on the received latency values, the delay request value representing additional downstream delay to be added to a first of the A/V streams in order to better synchronize the A/V streams; and the transmitter section configured to transmit the delay request value to a first of the downstream devices and to transmit the A/V streams to the downstream devices, the first downstream device to receive the first A/V stream.

* * * * *